United States Patent
De Cheveigne

(10) Patent No.: US 6,668,258 B2
(45) Date of Patent: Dec. 23, 2003

(54) METHOD FOR THE SCALING OF THE INDEXING DATA OF A MULTIMEDIA DOCUMENT

(76) Inventor: Alain De Cheveigne, 26, Rue de Lappe, 75011 Paris (FR)

( * ) Notice: Subject to any disclaimer, the term of this patent is extended or adjusted under 35 U.S.C. 154(b) by 196 days.

(21) Appl. No.: 09/964,250

(22) Filed: Sep. 26, 2001

(65) Prior Publication Data

US 2003/0105754 A1 Jun. 5, 2003

(51) Int. Cl.[7] .............................................. G06F 17/30
(52) U.S. Cl. ......................... 707/102; 707/104.1; 707/3
(58) Field of Search ........................... 707/1–3, 4, 100, 707/102, 104.1; 382/173

(56) References Cited

U.S. PATENT DOCUMENTS

| | | | | |
|---|---|---|---|---|
| 5,778,354 A | * | 7/1998 | Leslie et al. | 707/2 |
| 5,832,495 A | * | 11/1998 | Gustman | 707/102 |
| 5,950,186 A | * | 9/1999 | Chaudhuri et al. | 707/2 |
| 6,154,746 A | * | 11/2000 | Berchtold et al. | 707/100 |
| 6,243,713 B1 | * | 6/2001 | Nelson et al. | 707/104.1 |
| 6,332,037 B1 | * | 12/2001 | Zhu | 382/173 |

OTHER PUBLICATIONS

Swain, M.J., Searching for multimedia on the World Wide Web; Jun. 7–11, 1999; Multimedia Computing and Systems, 1999. IEEE International Conference on , vol. 1 ; Page(s): 32–37.*

Adami, N.; Bugatti, A ; ToCAI: A framework for indexing and retrieval of multimedia documents; Corghi, A.; Leonardi, R.; Migliorati, P.; Rossi, L.A., Saraceno,C.; Image Analysis and Processing, 1999.*

Young, S.J.; Brown, M.G.; Foote, J.T.; Jones, G.J.F.; Sparck Jones, K.; Acoustic indexing for multimedia retrieval and browsing Acoustics, Speech, and Signal Processing, 1997. ICASSP–97., 1997 IEEE.*

* cited by examiner

*Primary Examiner*—Diane D. Mizrahi
*Assistant Examiner*—Prakash C. Punit
(74) *Attorney, Agent, or Firm*—Patterson, Thuente, Skaar & Christensen, L.L.C.

(57) ABSTRACT

A method for scaling of indexing data $D=(d_n, n=1$ to $N)$ of a multimedia document having the following steps: (a) at the time t, in grouping the data D in distinct and consecutive groups $D_j$ respectively sized $n'_j$, j varying from 1 to J and in respectively scaling each group $D_j$ by a value $d'_j$ according to at least one determined scaling method C and in storing the data $D'=(d'_j, j=1$ to $J)$ thus obtained, (b) subsequently, at the time t'>t, when the number of data resulting from the previous scaling is too great, in grouping the data D' in distinct and consecutive groups $D'_k$ respectively sized $J_k$, k varying from 1 to K and respectively scaling each group $D'_k$ by a value $d''_k$ according to a rescaling method C' compatible with the scaling method C in such a way that each of the data $d''_k$ is equivalent to that obtained by applying the scaling method C directly to distinct and consecutive groups of data D respectively sized $n''_k$, $n''_k$ being the sum of the $n'_j$ values of the group $D'_k$ and in storing the scaled data $D''=(d''_k, k=1$ to $K)$.

20 Claims, No Drawings

METHOD FOR THE SCALING OF THE INDEXING DATA OF A MULTIMEDIA DOCUMENT

BACKGROUND OF THE INVENTION

1. Field of the Invention

The invention relates to the scaling of the indexing data of a multimedia document.

The field of the invention is that of the storage of and/or searching for digital multimedia documents in a database.

Prior to being stored in a database, a multimedia document is indexed. These indexing data pertaining to details such as the author, type, date of creation, a summary, descriptions, etc. are associated with the document. They are used especially to sort out the document by author, descriptor, etc. and/or classify the documents and/or of course search for a document, generally with a view to accessing the found document.

The volume of documents to be stored and therefore the associated indexing data is increasing every year. According to certain sources, it is thought that the storage requirements of certain companies are more than doubled every year.

2. Description of the Prior Art

Encoding methods have been developed, designed to reduce the volume of data to be stored.

Certain encoding methods relate to documents: they reduce the volume of the document itself while providing for its total or almost total restitution by a decoding method corresponding to the encoding method used.

Other methods relate to the scaling of the indexing data of a multimedia document. This scaling is aimed of course at reducing the volume of these indexing data but it is not indispensable for it to restitute these indexing data. It should be possible, with the scaled data, for example to sort out multimedia documents and/or to classify and/or search for a multimedia document by making comparisons between these indexing data and the indexing data of the documents of the database.

The reduction of the volume of the indexing data obtained by scaling at a given time may prove to be subsequently insufficient, especially when the volume of initial data increases and/or it is sought to obtain a higher scale ratio.

It is then possible to rescale the initial data. This is a painstaking and even impossible operation when the data are inaccessible. It is also possible to redo a scaling operation on these already scaled data and another scaling operation on the new (as yet non-scaled) data. These data, thus scaled according to different scaling operations, generally result in a disparity between the scale ratios and between the scaled data. The sorting or searching operations performed on these indexing data thus scaled cannot be performed on all the scaled data but on each category of scaled data.

It is an aim of the invention to avoid these disparities.

SUMMARY OF THE INVENTION

An object of the invention is a method for the scaling of the indexing data of a multimedia document such that the scale ratio of the scaled data may be subsequently increased to make these data more compact, with a guarantee that the data thus obtained will be equivalent to the data obtained by applying a higher scale ratio to the initial data at the very outset.

When, for example, the initial data are initially scaled in groups of size N' and the scaled data are scaled once again in groups of size N", the resulting data are equivalent to the data obtained by the scaling of groups of initial data of size N'N".

More generally, if the initial data are initially scaled in groups sized $n'_j$, with j=1 to J to obtain scaled data $d'_j$ and if these scaled data are rescaled in groups $D'_k$ sized $J_k$ with k=1 to K, the resulting scaled data $d''_K$ are the same as they would be if the scaling were to be done directly on groups of initial data sized $n''_k$, $n''_k$ being the sum of the $n'_j$ values of the group $D'_k$.

An object of the invention is a method for the scaling of indexing data $D=(d_n, n=1$ to $N)$ of a multimedia document wherein mainly the method comprises the following steps which consist:

a) at the time t, in grouping the data D in distinct and consecutive groups $D_j$ respectively sized $n'_j$, j varying from 1 to J and respectively scaling each group $D_j$ to a value $d'_j$ according to at least one determined scaling method C, and in storing the data $D'=(d'_j, j=1$ to $J)$ thus obtained.

b) subsequently, at the time t'>t, when the number of data resulting from the previous scaling operation is too great, in grouping the data D' in distinct and consecutive groups $D'_k$ respectively sized $J_k$, k varying from 1 to K and scaling each group $D'_k$ by a value $d''_k$ according to a rescaling method C' compatible with the scaling method C in such a way that the data $d''_k$ are equivalent to those obtained by applying the scaling method C directly to distinct and consecutive groups of data of D sized $n''_k$, $n''_k$ being the sum of the $n'_j$ values of the group $D'_k$ and in storing the scaled data $D''=(d''_k, k=1$ to $K)$.

According to one characteristic of the invention, the step b) is reproduced using, for D', the data resulting from the last rescaling operation.

According to another characteristic of the invention, with the data $d'_j$, there are associated the sizes $n'_j$ and/or with the data $d''_K$, there are associated the sizes $n''_k$.

According to another additional characteristic:

each datum $d_n$ is weighted by a weight $w_n$, each datum $d'_j$ is weighted by a weight $w'_j$, each of these weights being equal to the sum of the weights of the corresponding data of the groups $D_j$, each datum $d''_k$ is weighted by a weight $w''_k$, each of these weights being equal to the sum of the weights of the corresponding data of the groups $D'_K$, and the weight of each datum is associated with said datum.

Prior to the storage of the scaled data, a header comprising at least one label specifying the scaling method may be associated with the scaled data. The header furthermore advantageously comprises the number of data before and/or after the encoding.

According to one embodiment of the invention, the determined scaling method C is the method C7 based on the histogram of the data groups $D_j$ according to predefined categories and the rescaling method C' is the method C7' based on the computation of the sum, term by term, of groups of histograms of D'.

According to one characteristic of the invention, the data D are series of scalar values or vectors.

According to another embodiment of the invention, the determined scaling method C is the method C4 which consists of the random choice of a data from each group of data $D_j$ and the determined rescaling method C' is then the method C4' which consists of the random choice of one datum among each group of data $D'_k$.

According to another characteristic of the invention, the data $d''_k$ are equal to those obtained by applying the scaling method C directly to distinct and consecutive groups of data D respectively sized $n''_k$.

According to various embodiments of the invention:

- the determined scaling method C is the method C3 based on the computation of the mean of the groups of data $D_j$ and the rescaling method C' is the method C3' based on the computation of the mean of each group of data $D'_k$, or
- the determined scaling method C is the method C1 based on the computation of the minimum of each group of data $D_j$ and the rescaling method C' is the method C1' based on the computation of the minimum of each group of data $D'_k$, or
- the determined scaling method C is the method C2 based on the computation of the maximum of each group of data $D_j$ and the rescaling method C' is the method C2' based on the computation of the maximum of each group of data $D'_k$, or
- the determined scaling method C is the method C5 based on the choice of the first datum from each group of data $D_J$ and the rescaling method C' is the method C5' based on the choice of the first datum from each group of data $D'_k$, or
- the determined scaling method C is the method C6 based on the computation of the last datum from each group of data $D_j$ and the rescaling method C' is the method C6' based on the choice of the last datum from each group of data $D'_k$, or
- the determined scaling method C is the method C3 based on the computation of the mean of each group of data $D_j$, then the method C8 based on the computation of the variance of each group of data $D_j$ and the rescaling method C' is the method C8' based on the means of the groups of data $D'_k$ resulting from scaling according to C8 and the variances of the groups of data $D'_k$ resulting from scaling according to C3.

According to one characteristic of the invention, all sizes $n'_j$ and $J_k$ are powers of two.

According to another embodiment of the invention, the determined scaling method C is the method C3 based on the computation of the mean of each group of data $D_j$ and then the method C9 based on a decomposition of the variance of each group of data $D_j$ into a series of coefficients each describing the variability at a particular scale, and the rescaling method C' is then the method C9', based on the means of the groups of data $D'_k$ resulting from scaling according to C9, and a decomposition of the variance of the groups of data $D'_k$ resulting from scaling according to C3.

According to another embodiment, in the event that the data D consist of a series of vectors, the determined scaling method C is the method C3 based on the computation of the mean of each group of data $D_j$ and then the method C10 based on the computation of the covariance of each group of data $D_j$ and the rescaling method C' is the method C10' based on the computation of the mean of groups of data $D'_k$ resulting from scaling according to C10 and of the covariance of groups of data $D'_k$ resulting from scaling according to C3.

In the event that the data D are vectors, the determined scaling method C may be the method C3 based on the computation of the mean of each group of data $D_j$, and then the method C11 based on the computation of the sum of the terms of the diagonal of the covariance matrix of each group of data $D_j$ and the rescaling method C' may be the method C11' based on the computation of the mean of each group of data $D'_k$ resulting from scaling according to C11 and the sum of the terms of the diagonal of the covariance matrix each group of data $D'_k$ resulting from scaling according to C3.

MORE DETAILED DESCRIPTION

Other features and advantages of the invention shall appear clearly from the following description given by way of a non-restrictive example.

The indexing data (whether original or already scaled by other methods) of a digital multimedia document may take the form of a series D of data, most usually digital data.

This representation in serial form is particularly suited to temporal data. These data may be scalar values or they may be vectors according to the indexing data considered.

Certain indexing data, known as low level descriptors, are obtained from the contents of the document by standard signal processing methods. In an audio document for example, indexing data obtained from the audio signal may represent its fundamental frequency, its spectral centroid, etc. These data are particularly bulky.

Other indexing data are obtained from the signal by more elaborate methods for example such as data pertaining to pitch in the case of an audio document relating to a musical instrument.

Other indexing data consist of statistics, for example the density of occurrence of events such as transients in an audio signal, musical notes, etc.

According to the invention, the indexing data D are scaled in at least two steps, the reduction of the data obtained at the end of the first scaling step at the time t having proved to be insufficient so that another scaling step is performed at a time t' followed, as the case may be, by other steps of scaling performed subsequently.

The scaled data of D' obtained at the end of a first scaling step and D" obtained at the end of the second scaling step are stored with information defining the arrangement of the data elements by means of a header indicating especially the scaling method(s) used, possibly the presence of weights and/or the number of data of the initial series and/or of the series obtained after scaling.

As illustrated here above, in the first step, the indexing data $D=(d_n, n=1$ to $N)$ are scaled according to a determined scaling method C that is applied to groupings of these data D into distinct and consecutive groups $D_j$ with j=1 to J, each of these groups having respectively a size $n'_j$ and being scaled or summarized by a value $d'_j$. The size $n'_j$ of a group is the number of original data in the group $D_j$.

In the second step, the scaled data elements $D'=(D_j, j=1$ to J) are scaled according to a rescaling method C' compatible with the scaling method C, the rescaling method C' being applied to groupings of the data D' in distinct and consecutive groups $D'_k$, k=1 to K, each of these groups respectively having a size $J_k$. The size $J_k$ of these groups is the number of scaled data in the group $D'_k$.

The result obtained is equivalent to the one obtained by applying the scaling method C to groups $D_k$ of $n''_k$ original data, $n''_k$ being the sum of the $n'_j$ values of the group $D'_k$.

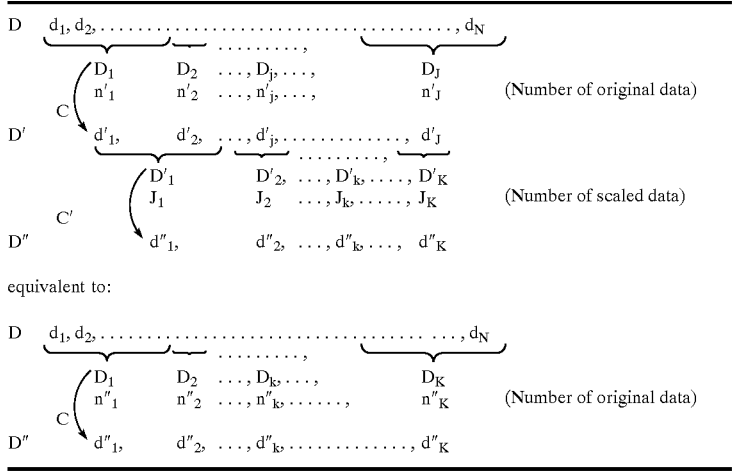

equivalent to:

If the data are weighted, each original datum $d_n$, n varying from 1 to N, has an associated weight $w_n$ and each scaled datum $d'_j$, with j varying from 1 to J, has an associated weight $w'_j$, this weight being the sum of the weights of corresponding original data. When the scaled data are rescaled, the weight $w''_k$ associated to the datum $d''_k$ is the sum of the weights $w'_j$ of the corresponding data $d'_j$ from which $d''_k$ was derived. The weights come into play in the scaling operations C and C'.

The scaled data D' and/or D'' may be encoded by any reversible encoding method such as "run encoding" in order to reduce their volume. In this case, they are decoded prior to being scaled by the determined encoded C'.

Prior to the definition of the scaling methods, notations are introduced to designate the mean, the variance and the scalewise decomposition of the variance of groups of numbers.

The mean of a group of numbers $x_i$, i varying from 1 to I, is computed according to the following formula;

$$M_{i=1}^{I}(x_i) = (1/I)\sum_{i=1}^{I} x_i$$

If the numbers $x_i$ are accompanied by weights $w_i$ that do not sum to zero, the weighted mean is computed according to the formula:

$$M_{i=1}^{I}(x_i, w_i) = \left(1 / \sum_{i=1}^{I} w_i\right)\sum_{i=1}^{I} w_i x_i$$

The variance of a group of data $x_i$ is computed according to the formula:

$$V_{i=1}^{I}(x_i) = (1/I)\sum_{i=1}^{I} [x_i - M_{j=1}^{I}(x_i)]^2$$

If the numbers $x_i$ are accompanied by weights $w_i$ that do not sum to zero, the weighted variance is computed according to the formula:

$$V_{i=1}^{I}(x_i, w_i) = \left(1 / \sum_{i=1}^{I} w_i\right)\sum_{i=1}^{I} w_i[x_i - M_{j=1}^{I}(x_j, w_j)]^2$$

If the number of values $x_i$ is a power of two $I=2^Q$, it is possible to define a decomposition of the variance $V_{i=1}^{I}(x_i)$ into a sequence of terms $S_{i=1}^{I}(x_i,q)$, with q varying from 1 to Q (scalewise variance). The first term is the mean of the variances computed on distinct and consecutive pairs of values $x_i$:

$$S_{i=1}^{I}(x_i, 1) = (2/I)\sum_{k=1}^{I/2} V_{j=2k-1}^{2k}(x_j)$$

The qth-order term is obtained first of all by computing the sequence $x'_j$ of the means of the groups of distinct and consecutive values $x_i$ sized $2^{q-1}$, with j varying from 1 to $I/2^q$, and then by applying the following formula to the values $x'_j$:

$$S_{i=1}^{I}(x_i, q) = (2^q/I)\sum_{k=1}^{I/2^q} V_{j=2k-1}^{2k}(x'_j)$$

The sum of the values $S_{i=1}^{I}(x_i,q)$, q=1, ..., Q is equal to the variance $V_{i=1}^{I}(x_i)$. The low-order terms reflect a short-term variability, while the high-order terms reflect a long-term variability.

If the numbers $x_i$ are accompanied by weights $w_i$ that do not sum to zero, the formulae are based on weighted means and variance values:

$$S_{i=1}^{I}(x_i, w_i, 1) = \left(1 / \sum_{k=1}^{I} w_k\right)\sum_{k=1}^{I/2} (w_{2k-1} + w_{2k})V_{j=2k-1}^{2k}(x_j, w_j)$$

$$S_{i=1}^{I}(x_i, w_i, q) = \left(1 / \sum_{k=1}^{I} w_k\right)\sum_{k=1}^{I/2^q} (w'_{2k-1} + w'_{2k})V_{j=2k-1}^{2k}(x'_j, w'_j)$$

where the $x'_j$ values are weighted means, each with a weight $w'_j$. Weighting gives a simple way of generalizing these formulae to a sequence of numbers having a size I other than a power of two: it is sufficient to pad the sequence with enough numbers with arbitrary value and zero weight to obtain a total size power of two.

The above formulae can be applied also to series of M-dimensional vectors, $X_i=(x_i(m), m=1, \ldots, M, i=1, \ldots, I)$. For this purpose, the formulae are applied successively for each m to the sequence $(x_i(m), i=1, \ldots, I)$, and a vector is formed from the results.

The covariance matrix of a series $X_i$ of I M-dimensional vectors is defined as followed, m and m' varying from 1 to M:

$$C_{i=1}^{I}(X_i)(m, m') = (1/I)\sum_{i=1}^{I} [x_i(m) - M_{j=1}^{I}(x_i(m))][x_i(m') - M_{j=1}^{I}(x_i(m'))]$$

If the I vectors $X_i$ are accompanied by weights $w_i$ having a non-zero sum, the weighted covariance matrix is computed according to the formula:

$$C_{i=1}^{I}(X_i, w_i)(m, m') =$$

$$\left(1 / \sum_{i=1}^{I} w_i\right)\sum_{i=1}^{I} w_i [x_i(m) - M_{j=1}^{I}(x_i(m), w_j)][x_i(m') - M_{j=1}^{I}(x_i(m'), w_j)]$$

These definitions are used hereinafter to define the scaling and rescaling methods C and C'.

For convenience's sake, we assume that the data $d_n$ with n=1 to N are respectively weighted by weights $w_n$. The case in which there is no weighting is handled by assigning a weight equal to 1 to each of these data, a weight $w'_1=n'_1$, $w'_2=n'_2, \ldots w'_J=n'_J$ to each data $d'_j$ with j=1 to J and a weight $w''_1=n''_1, w''_2=n''_2, \ldots, w''_K=n''_K$ to each data $d''_k$ with k=1 to K. The weights then do not need to be stored. The definitions of C and C' can generally apply to groups of data whose weights are not all zero. When all the weights of a group are zero, the scaled values are immaterial because they have zero weights.

Hereinafter, according to one particular embodiment, with the data are associated their weights as well as the size of the corresponding data groups.

The scaling and rescaling methods C and C' are chosen from among the following methods.

The scaling method C1 defines the minimum of the values with non-zero weight of each of the groups of data of D. The rescaling method C1' defines the minimum of the values with non-zero weight of each of the groups of data of D' resulting from the scaling according to C1.

The scaling method C2 defines the maximum of the values with non-zero weight of each of the groups of data of D. The rescaling method C2' defines the maximum of the values with non-zero weight of each of the groups of data of D' resulting from the scaling according to C2.

The scaling method C3 defines the weighted mean of each of the groups of data of D. If $D_j=(d_n, w_n, n=n'_1 + \ldots + n'_{j-1}+1, \ldots, n'_1 + \ldots + n'_{j-1}+n'_j)$ is a group of weighted data of D, sized $n'_j$, the value scaled according to C3 is $m'_j$:

$$m'_j = M_{n=1+n'_1+\ldots+n'_{j-1}}^{n'_1+\ldots+n'_j}(d_n, w_n)$$

The rescaling method C3' defines the weighted mean of each of the groups of data of D'. If $D'_k=(m'_j; n'_j; w'_j,$ $j=J_1 + \ldots + J_{k-1}+1, \ldots, J_1 + \ldots + J_{k-1}+J_k)$ is a group of data scaled according to C3, the value scaled according to C3' is $m''_k$:

$$m''_k = M_{j=1+J_1+\ldots+J_{k-1}}^{J_1+\ldots+J_k}(m'_j, w'_j)$$

The scaling method C4 defines a value chosen randomly with a probability proportional to its weight from among each of the groups of data of D; the rescaling method C4' defines a value chosen randomly with a probability proportional to its weight among the data elements of D' resulting from the scaling according to C.

The scaling method C5 defines the first value with non-zero weight of each of the groups of data of D; the rescaling method C5' defines the first value with non-zero weight of each of the groups of data of D' resulting from the scaling according to C.

The scaling method C6 defines the last value with non-zero weight of each of the groups of data of D; the rescaling method C6' defines the last value with non-zero weight of each of the groups of data of D' resulting from the scaling according to C.

The scaling method C7 defines the histogram of groups of data elements of D, namely the sum of the weights of the values belonging to each category of a set of categories such as for example numerical intervals or categories in a wider sense; the rescaling method C7' consists of the term-by-term summing of the groups of data of D' resulting from the scaling according to C7.

The scaling method C8 defines the weighted variance of each of the groups of data of D. If $D_j=(d_n, w_n, n=n'_1 + \ldots + n'_{j-1}+1, \ldots, n'_1 + \ldots + n'_{j-1}+n'_j)$ is a group of data of D sized $n'_j$, the scaled value according to C8 is $v'_j$:

$$v'_j = V_{n=1+n'_1+\ldots+n'_{j-1}}^{n'_1+\ldots+n'_j}(d_n, w_n)$$

The rescaling method C8' defines the sum of the weighted mean of the data of D' resulting from the scaling according to C8, and the weighted variance of the data of D' resulting from the scaling according to C3. More specifically, if $D'_k=(d'_j; n'_j; w'_j, j=1+J_1+\ldots+J_{k-1}+1, \ldots, J_1 + \ldots +J_{k-1}+J_k)$ is a group of scaled data, $d'_j=(m'_j, v'_j)$, $m'_j$ being scaled according to C3 (mean) and $v'_j$ being scaled according to C8 (variance), then the result of the scaling of $D_k$ by C8' is:

$$v''_k = V_{j=1+J_1+\ldots+J_{k-1}}^{J_1+\ldots+J_k}(m'_j, w'_j) + M_{j=1+J_1+\ldots+J_{k-1}}^{J_1+\ldots+J_k}(v'_j, w'_j)$$

The scaling method C9 can advantageously be applied when the number $n'_j$ of data of each group $D_j=(d_n, w_n, n=n'_1 + \ldots + n'_{j-1}+1, \ldots, n'_1 + \ldots + n'_{j-1}+n'_j)$ is a power of two $n'_j=2^Q$, and defines the decomposition of the weighted variance into a series of coefficients $s_j(q)$ each describing the variability at a particular scale, q varying from 1 to Q:

$$s'_j(q) = S_{i=1+n'_1+\ldots+n'_{j-1}}^{n'_1+\ldots+n'_j}(d_i, w_i, q)$$

The rescaling method C9' can be applied to a group $D'_k=(d'_j; n'_j; w'_j, j=J_1 + \ldots + J_{k-1}+1, \ldots, J_1 + \ldots + J_{k-1}+J_k)$ of data scaled according to C9 and C3 when the numbers $n'_j$ are all equal to one and the same power of two, $n_j=2^Q$, and the numbers $J_k$ are themselves a power of two $J_k=2^{Q'}$. Then the rescaling method C9' defines the term-by-term weighted mean of the coefficients $s'_j(q)$, q varying from 1 to Q, complemented by a decomposition of the weighted variance of the sequence of the mean values $m'_j$.

for $q = 1, \ldots, Q$: $\quad s''_k(q) = M_{j=1+J_1+\ldots+J_{k-1}}^{J_1+\ldots+J_k}[s'_j(q), w'_j]$ for $q = Q+1, \ldots, Q+Q'$: $\quad s''_k(q) = S_{j=1+J_1+\ldots+J_{k-1}}^{J_1+\ldots+J_k}(m'_j, w'_j, q-Q)$ The scaling operations C1 to C9 and C1' to C9' can equally well be applied to scaling series of scalar values and to the scaling of each dimension of a series of vectors.

The following scaling operations C10, C10', C11, C11' are applied to series of vectors.

The scaling method C10 defines the weighted covariance matrix of each of the groups of data of D. If $D_j=(d_n; w_n, n=n'_1+\ldots+n'_{j-1}+1, \ldots, n'_1+\ldots+n'_{j-1}+n'_j)$ is a group of vectors with a dimension M, the value scaled according to C10 is the covariance matrix with a size M×M:

$$c'_j = C_{n=1+n'_1+\ldots+n'_{j-1}}^{n'_1+\ldots+n'_j}(d_n, w_n)$$

The rescaling method C10' defines the weighted mean of each of the groups of data of D' resulting from the scaling according to C11, added to the weighted covariance matrix of each of the groups of data D' resulting from the scaling according to C3. More specifically, if $D'_k=(d'_j; n'_j; w'_j, j=J_1+\ldots+J_{k-1}+1, \ldots, J_1+\ldots+J_{k-1}+J_k)$ is a group of scaled data elements $d'_j=(m'_j,c'_j)$, $m'_j$ being scaled according to C3 (mean) and $c'_j$ being scaled according to C10 (covariance), then the result of the scaling of $D'_k$ by C10' is:

$$c''_k = C_{j=1+J_1+\ldots+J_{k-1}}^{J_1+\ldots+J_k}(m'_j, w'_j) + M_{j=1+J_1+\ldots+J_{k-1}}^{J_1+\ldots+J_k}(c'_j, w'_j)$$

The scaling method C11 defines the sum of the terms of the diagonal of the covariance matrix of each of the groups of data of D. If $D_j=(d_n; w_n, n=n'_1+\ldots+n'_{j-1}+1, \ldots, n'_1+\ldots+n'_{j-1}+n'_j)$ is a group of vectors with a dimension M, the value scaled according to C11 is the scalar value:

$$b'_j = \sum_{m=1}^{M} C_{n=1+n'_1+\ldots+n'_{j-1}}^{n'_1+\ldots+n'_j}(d_n, w_n)(m, m)$$

The rescaling method C11' defines the weighted mean of each of the groups of data of D scaled according to C11, added to the sum of the terms of the diagonal of the weighted covariance matrix of each of the groups of data D resulting from the scaling according to C3. More specifically, if $D'_k=(d'_j; n'_j; w'_j, j=J_1+\ldots+J_{k-1}+1, \ldots, J_1+\ldots+J_{k-1}+J_k)$ is a group of scaled data, $d'_j=(m'_j,b'_j)$, $m'_j$ being scaled according to C3 (mean) and $b'_j$ being scaled according to C11 (sum of the terms of the diagonal of the covariance matrix), then the result of the scaling of $D'_k$ by C11' is the scalar value:

$$b''_k = \sum_{m=1}^{M} C_{j=1+J_1+\ldots+J_{k-1}}^{J_1+\ldots+J_k}(m'_j, w'_j)(m, m) + M_{j=1+J_1+\ldots+J_{k-1}}^{J_1+\ldots+J_k}(b'_j, w'_j)$$

When the method according to the invention is applied with the scaling method C4, the result obtained by successive scaling operations is equivalent to the result obtained by a single scaling operation inasmuch as the probability that a datum has been chosen is the same however the scaling is applied, even if the chosen datum itself differs.

For the other scaling operations, the equivalence can be expressed by an equality of the results.

We shall illustrate the scaling methods that apply to scalar series on a series of 16 non-weighted scalar data $d_1, d_2, \ldots, d_{16}$, which for example represent the power of an audio signal:

D=(1 1 3 3 4 4 0 0 6 6 1 1 2 2 3 3)

In a first example, we shall first of all scale the series D by the scaling method C1 (minimum) applied to eight groups of two ($n'_1=n'_2=\ldots=n'_8=2$) to obtain D', and then scale D' by the rescaling method C1' applied to two groups of three and a group of two (namely $J_1=3$, $J_2=3$, $J_3=2$) to obtain D".

The result of the first step is D'=(1, 3, 4, 0, 6, 1, 2, 3; 2, 2, 2, 2, 2, 2, 2, 2), formed by the sequence of the minimum values followed by the sequence of sizes $n'_1, n'_2, \ldots, n'_8$ of the eight groups on which each minimum value has been computed. The weights $w_j$ are omitted because they are equal to $n_j$.

The result of the second step is D"=(1, 0, 2; 3, 3, 2) formed by the sequence of the minimum values followed by the sizes $n''_1, n''_2, n''_3$, of the three groups of D' on which each minimum value has been calculated.

It is properly ascertained that the sequence of the minimum values obtained is identical to the one that would have been obtained by scaling D by the scaling method C1 applied to two groups of six followed by one group of four.

The size $n''_k$ of these groups is indeed computed by summing the $n'_j$ values of each of groups $D'_k$.

In the present case, since $J_1=3$, $J_2=3$ and $J_3=2$, we obtain:

for $D'_1=(1,3,4)$ $n'_1+n'_2+n'_3=2+2+2=6=n''_1$ for $D'_2=(0,6,1)$ $n'_4+n'_5+n'_6=2+2+2=6=n''_2$ for $D'_3=(2,3)$ $n'_7+n'_8=2+2=4=n''_3$ In a second example, the same series D will be scaled by the scaling methods C3 (mean) and C8 (variance) applied to four groups of four to obtain D', and then D' will be scaled by the rescaling methods C3' and C8' applied to two groups of two to obtain D".

The result of the first step is the sequence D'=(M'; N') for the scaling method C3 and D'=(V'; N') for the scaling method C8, with M'=(2, 2, 3.5, 2.5), V'=(1, 4, 6.25, 0.25) and N'=(4, 4, 4, 4). Indeed, each term of M' is the mean of the corresponding group of terms of D, for example for the first term: 2=(1+1+3+3)/4 and each term of V' is the variance of the corresponding group of terms of D, for example for the first term: $1=[(1-2)^2+(1-2)^2+(3-2)^2+(3-2)^2]/4$.

The result of the second step is the sequence D"=(M"; N") by the rescaling method C3' and D"=(V"; N") by the rescaling method C8' with M"=(2, 3), V"=(2.5, 3.5) and N"=(8,8). It is properly ascertained that each term of M" is the weighted mean of the two corresponding terms (of equal weight) of M', for example the second term: 3=(4*3.5+4*2.5)/8, and that each term of V" is the weighted mean of the corresponding terms of V', added to the weighted variance of the corresponding terms of M'. For example for the second term: $3.5=(4*6.25+4*0.25)/8+[4*(2.5-2)^2+4*(1.5-2)^2]/8$.

The result is quite identical to the one that would have been obtained by scaling D by the scaling method C3 and C8 applied to two groups of eight.

In a third example, the series D will be scaled by the scaling method C3 (mean) and the scaling method C9 (decomposition of the scalewise variance) applied to two series of eight to obtain D', then D' will be scaled by the rescaling methods C3' and C9' applied to a group of two to obtain D".

The result of the first step is D'=(M'; N') by the scaling method C3 and D'=(S'; N') by the scaling method C9 with M'=(2, 3), $$S' = \begin{bmatrix} 0 & 0 \\ 2.5 & 3.25 \\ 0 & 0.25 \end{bmatrix}$$

and N'=(8, 8). Indeed, each term of M' is the weighted mean of the eight corresponding values of D (with a weight equal to one), for example for the first 2=(1+1+3+3+4+4+0+0)/8. Similarly, each term of S' is a decomposition of the weighted variance of the eight corresponding values of D. For example the first term of S' is a vector of three components of which the first is the weighted mean of the weighted variance of terms of D taken two by two:

$$0 = \{[(1-1)^2 + (1-1)^2] + [(3-3)^2 + (3-3)^2] + [(4-4)^2 + (4-4)^2] + [(0-0)^2 + (0-0)^2]\}/8,$$

the second is the weighted mean of the weighted variance values of the weighted means of two values taken two by two:

$$2.5 = \{2*[(1-2)^2+(3-2)^2]+2*[(4-2)^2+(0-2)^2]\}/8$$

and the third is the weighted variance of the weighted means of the values taken four by four:

$$0=[4*(2-2)^2+4*(2-2)^2]/8$$

It is also possible to verify that the sum of the coefficients of the first term of S' is truly equal to the variance of the corresponding eight terms and that it is the same for the second term of S'.

The result of the second step is D"=(M"; N") by the rescaling method C3' and D" (S"; N") by the rescaling method C9' with M"=(2.5), $$S'' = \begin{bmatrix} 0 \\ 2.875 \\ 0.125 \\ 0.25 \end{bmatrix}.$$

and N"=(16). It is ascertained that the first three coefficients of S" are equal to the weighted mean of the corresponding terms of S', for example for the second: 2.875=(4*2.5+4*3.25)/8, and that the fourth coefficient of S" is truly the decomposition of the weighted variance (herein into a single coefficient) of the two terms of M': 0.25=[4*(2-2.5)$^2$+4*(3-2.5)$^2$]/8. It can be noted that the first term of S" is zero. This reflects the fact that D consists of pairs of equal values.

In a fourth example, the original data are supposed to be weighted: D=(1 1 3 3 4 4 0 0 6 6 1 1 2 2 3 3; 0 0 1 1 0 0 1 1 1 1 1 1 0 0 0 0).

D will be scaled according to C5 (choice of the first value with non-zero weight) applied to pairs to obtain D', and then D' will be scaled according to C5' applied to pairs to obtain D", and then D" will be scaled by C5" applied to pairs to obtain D"', and then finally D"' will be scaled by C5' to obtain D"".

The result of the first step is D'=(x,3,x,4,0,6,1,x,x;2,2,2, 2,2,2,2,2;0,2,0,2,2,2,0,0). The values x are immaterial because they have zero weight; it is possible for example to give them the value 0.

The result of the second step is D"=(3,0,6,x; 4,4,4,4; 2,2,4,0).

The result of the third step is D"'=(3,6; 8,8; 4,4).

The result of the fourth and last step is D""=(3; 16; 8).

It is ascertained that, at each step, the first value with non-zero weight of each group has been chosen and that the finally obtained value is truly the first value with non-zero weight applied to a group of 16 data, namely applied to D.

In a fifth example, the same weighted data are taken. In a first stage, they are scaled with the scaling method C7 (histogram) applied to a group of four, a group of five and a group of seven values of D to form D'. In a second stage, the three values of D' are scaled in a single value D". The histogram uses categories that are three predetermined intervals supposed to be known: ]–infinity, 2], ]2,5], ]5, +infinity[.

The result of the first step is D'=[H'; N'; W']with $$H' = \begin{bmatrix} 0 & 2 & 2 \\ 2 & 0 & 0 \\ 0 & 1 & 1 \end{bmatrix},$$

N'=(4,5,7), W'=(2,3,3). It is ascertained that each column of H' is truly the histogram of the values of the corresponding group of D. For example the last column comprises, in the order given, the total weight of those of the seven last values of D that are smaller than or equal to 2 (four including two with zero weight), those greater than 2 and smaller than or equal to 5 (2 with zero weight) and those greater than 5 (1).

The result of the second step is D"=[H", N", W"], with $$H'' = \begin{bmatrix} 4 \\ 2 \\ 2 \end{bmatrix},$$

N"=16, W"=8. It is ascertained that H" is the sum of the terms of H' and that it is truly the histogram of the values of D.

In this example, each weight W' or W" is equal to the sum of the columns of H' or H" respectively, since the categories overlap the entire range of possible values.

We shall illustrate the scaling methods that are applied to the vectors on a non-weighted series of 16 vectors with a size 3, for example representing the simplified spectrum of an audio signal:

$$D = \begin{bmatrix} 1 & 1 & 3 & 3 & 4 & 4 & 0 & 0 & 6 & 6 & 1 & 1 & 2 & 2 & 3 & 3 \\ 0 & 0 & 0 & 0 & 0 & 0 & 0 & 0 & 0 & 0 & 0 & 0 & 0 & 0 & 0 & 0 \\ 3 & 3 & 2 & 2 & 1 & 1 & 6 & 6 & 0 & 0 & 4 & 4 & 3 & 3 & 1 & 1 \end{bmatrix}$$

In a first example, this series will be scaled with the scaling method C3 and the scaling method C8 applied to four groups of four values of D to obtain D', then with the rescaling methods C3' and C8' applied to a group of four values of D' to obtain D".

The result of the first step is D'=(M'; N') by the scaling method C4 and D'=(V'; N') by the scaling method C8, with $$M' = \begin{bmatrix} 2 & 2 & 3.5 & 2.5 \\ 0 & 0 & 0 & 0 \\ 2.5 & 3.5 & 2 & 2 \end{bmatrix}, V' = \begin{bmatrix} 1 & 4 & 6.25 & 0.25 \\ 0 & 0 & 0 & 0 \\ 0.25 & 6.25 & 4 & 1 \end{bmatrix}$$

and N'=(4,4,4,4). It is not necessary to show W', because W'=N'. It is properly verified that each column of M' is the weighted mean of four corresponding vectors of D, for example for the first column 2=(1+1+3+3)/4, 0=(0+0+0+0)/4, 2.5=(3+3+2+2)/4, and that each column of V' is the weighted variance of the four corresponding vectors of D, for example for the first column, $$1=[(1-2)^2+(1-2)^2+(3-2)^2+(3-2)^2]/4$$

$$0=[(0-0)^2+(0-0)^2+(0-0)^2+(0-0)^2]/4$$

$$1=[(3-2.5)^2+(3-2.5)^2+(2-2.5)^2+(2-2.5)^2]/4.$$

The result of the second step is D"=(M"; N") by the rescaling method C'4 and D"=(V"; N") by the rescaling method C8' with $$M'' = \begin{bmatrix} 2.5 \\ 0 \\ 2.5 \end{bmatrix}, V'' = \begin{bmatrix} 3.25 \\ 0 \\ 3.25 \end{bmatrix},$$

N"=(16). It is properly ascertained that the single column of M" is the weighted mean of the four columns of M', and that the single column of V" is the sum of the weighted mean of the four columns of V', and of the weighted variance of the four columns of M'. For example, for the first coefficient:

$$3.25=(4*1+4*4+4*6.25+4*0.25)/16+[4*(2-2.5)^2+4*(2-2.5)^2+4*(3.5-2.5)^2+4*(2.5-2.5)^2]/16.$$

It can be ascertained that the result is the same as if the scaling methods C3 and C8 have been applied directly to the 16 vectors of D.

In a second example, the series of vectors D will be scaled with the scaling method C3 (mean) and the scaling method C10 (covariance) applied to two groups of eight to obtain D', and then D' will be scaled with the rescaling method C3' and the rescaling method C10' to obtain D".

The result of the first step is D'=(M'; N') by the scaling method C3 and D'=(C'; N') with $$M' = \begin{bmatrix} 2 & 3 \\ 0 & 0 \\ 3 & 2 \end{bmatrix}, C' = \left( \begin{bmatrix} 2.5 & 0 & -2.75 \\ 0 & 0 & 0 \\ -2.75 & 0 & 3.5 \end{bmatrix} \begin{bmatrix} 3.5 & 0 & -2.75 \\ 0 & 0 & 0 \\ -2.75 & 0 & 2.5 \end{bmatrix} \right),$$

N'=(8,8).

It is ascertained that each column of M' is the weighted mean of the eight corresponding vectors of D and that each matrix of C' is the covariance matrix of the eight corresponding vectors of D.

The result of the second step is D"=(M"; N") by the rescaling method C'4 and D"=(C"; N') by the rescaling method C10' with $$M'' = \begin{bmatrix} 2.5 \\ 0 \\ 2.5 \end{bmatrix}, C'' = \left( \begin{bmatrix} 3.25 & 0 & -3 \\ 0 & 0 & 0 \\ -3 & 0 & 3.25 \end{bmatrix} \right),$$

N"=(16). It is ascertained that M" is the weighted mean of the two columns of M' and that C" is the sum of the weighted mean of the two columns of $$C' \left( \begin{bmatrix} 3 & 0 & -2.75 \\ 0 & 0 & 0 \\ -2.75 & 0 & 3 \end{bmatrix} \right)$$

plus the weighted covariance of the two columns of $$M' \left( \begin{bmatrix} 0.25 & 0 & -0.25 \\ 0 & 0 & 0 \\ -0.25 & 0 & 0.25 \end{bmatrix} \right).$$

It can be ascertained that the result is the same as if the scaling methods C3 and C10 had been applied directly to the 16 vectors of D.

In a third example, it will be assumed that the original data D are weighted:

$$D = \left( \begin{bmatrix} 1 & 1 & 3 & 3 & 4 & 4 & 0 & 0 & 6 & 6 & 1 & 1 & 2 & 2 & 3 & 3 \\ 0 & 0 & 0 & 0 & 0 & 0 & 0 & 0 & 0 & 0 & 0 & 0 & 0 & 0 & 0 & 0 \\ 3 & 3 & 2 & 2 & 1 & 1 & 6 & 6 & 0 & 0 & 4 & 4 & 3 & 3 & 1 & 1 \end{bmatrix} \right);$$

and their weights are 0.5, 0.5, 0.5, 0.5, 1, 1, 1, 1, 2, 2, 2, 2, 4, 4, 4, 4.

The series of vectors D will be scaled with the scaling method C3 (mean) applied to four groups of four to obtain D', and then D' will be scaled with the rescaling method C3' applied to two groups of two to obtain D".

The result of the first step is D'=(M', N', W'), $$M' = \begin{bmatrix} 2 & 2 & 3.5 & 2.5 \\ 0 & 0 & 0 & 0 \\ 2.5 & 3.5 & 2 & 2 \end{bmatrix},$$

N'=(4,4,4,4), W'=(2, 4, 8, 16). It is ascertained that each column of M' is the mean of the four corresponding columns of D.

The result of the second step is D"=(M", N", W"), with $$M'' = \begin{bmatrix} 2 & 2.83 \\ 0 & 0 \\ 3.17 & 2 \end{bmatrix},$$

N"=(8, 8), W"=(6, 24). It is ascertained that each column of M" is truly the weighted mean of the two corresponding columns of M'.

As indicated here above, with each of the series obtained there are associated information elements defining the arrangement of the data, the scaling operations used, the presence of weights, etc.

The following example describes a portion of an audio signal by means of a low level descriptor (AudioSpectrumFlatness). The data are recorded in a data structure (SeriesOfVector) that furthermore comprises data scaled according to C1 (Min), C2 (Max), C3 (Mean), and C8 (Variance), information on the scale ratio, etc. and on the arrangement of the data scaled in the corresponding file:

```
<AudioD xsi:type="AudioSpectrumFlatnessType">
    <SeriesOfVector>
        <Value vectorSize="4" totalSampleNum="128">
            <Scaling ratio="64" elementNum="2"/>
            <Min dim="2 4"> 1.3 1.1 1.4 1.8 1.5 1.6 1.3 1.9 </Min>
            <Max dim="2 4"> 1.8 1.4 1.7 2.6 2.2 2.4 2.6 2.8 </Max>
            <Mean dim="2 4"> 1.6 1.35 1.5 2.3 1.8 2.1 1.8 2.4 </Mean>
            <Variance dim="2 4"> 0.5 0.11 0.76 0.42 0.87 0.32 0.31 0.43
    </Variance>
        </Value>
    </SeriesOfVector>
</AudioD>
```

The method according to the invention has been applied to the production, organization and editing of audio data files. The volume of such data (namely the number and size of the files) is huge but each file has an associated indexing data file containing descriptors of the signal: the envelope of the signal, the spectral envelope, the fundamental frequency and the periodicity, the modulation spectrum, etc.

These data are used for the graphic display of any audio file in the form of its waveform envelope and/or its spectrum envelope. These data are used also, as the case may be, to synthesize a sound sample that is a fast summary of a lengthier sound document. They also enable classifying and/or searching for files and/or comparing files.

These descriptors may be crossed with metadata such as type etc. to remove ambiguities. They are based on series scaled according to the invention.

The method according to the invention has also been applied to the remote measurement of climatic, seismic, industrial and other parameters.

The data from the sensors are recorded at full resolution and stored in a circular buffer. Simultaneously, a scaled version with low resolution is streamed over a low bandwidth communications network to the remote control center. At regular intervals, the circular buffer is transferred to a digital disk. In order to avoid running out of disk space, the full resolution files are regularly processed to obtain scaled series and the previously scaled, older files are rescaled. The recording contains a complete history of the parameters, with temporal resolution that is reduced for older data. A set of statistics such as those obtained by the scaling methods based on the minimum, the maximum, the mean, the variance, etc. gives useful information on data discarded during successive scaling operations.

The method according to the invention is thus applied to obtain the scaled version having low resolution, to fit the data within finite storage, to store the data having high or low resolution and to obtain statistics that characterize the discarded data.

The method according to the invention is implemented by means of a device such as a computer comprising a central processor unit itself having a microprocessor and at least one working memory capable of carrying out scaling operations and one or more memories in which the data are stored.

What is claimed is:

1. A method for the scaling of indexing data $D=(d_n, n=1$ to $N)$ of a multimedia document wherein mainly the method comprises the following steps which consist:

a) at the time t, in grouping the data D in distinct and consecutive groups $D_j$ respectively sized $n'_j$, j varying from 1 to J and respectively scaling each group $D_j$ by a value $d'_j$ according to at least one determined scaling method C and in storing the data $D'=(d'_j, j=1$ to J) thus obtained, b) subsequently, at the time t'>t, when the number of data resulting from the previous scaling operation is too great, in grouping the data D' in distinct and consecutive groups $D'_k$ respectively sized $J_k$, k varying from 1 to K and respectively scaling each group $D'_k$ by a value $d''_k$ according to a rescaling method C' compatible with the scaling method C in such a way that each of the data $d''_k$ is equivalent to that obtained by applying the scaling method C directly to distinct and consecutive groups of data D respectively sized $n''_k$, $n''_k$ being the sum of the $n'_j$ values of the group $D'_k$ and in storing the scaled data $D''=(d''_k, k=1$ to K).

2. A method according to claim 1, wherein the step b) is reproduced using, for D', the data resulting from the last rescaling.

3. A method according to claim 1 wherein, with the data $d'_j$, there are associated the sizes $n'_j$ and/or with the data $d''_k$, there are associated the sizes $n''_k$.

4. A method according to claim 1, wherein:
   each datum $d_n$ is weighted by a weight $w_n$,
   each datum $d'_j$ is weighted by a weight $w'_j$, each of these weights being equal to the sum of the weights of the corresponding data of the groups $D_j$,
   each datum $d''_k$ is weighted by a weight $w''_k$, each of these weights being equal to the sum of the weights of the corresponding data of the groups $D'_k$,
   and wherein the weight of each data is associated with said data.

5. A method according to claim 1 wherein, prior to the storage of the scaled data, a header comprising at least one label specifying the scaling method is associated with the scaled data.

6. A method according to claim 5, wherein the header advantageously comprises the number of data before the scaling and/or the number of data obtained after the scaling.

7. A method according to claim 1, wherein the determined scaling method C is the method C7 based on the histogram of each data group $D_j$ according to predefined categories and the rescaling method C" is the method C7' based on the computation of the sum, term by term, of groups of histograms of D'.

8. A method according to claim 1, wherein the data D are series of scalar values or vectors.

9. A method according to claim 1, wherein the determined scaling method C is the method C4 which consists of the random choice of a datum from each group of data $D_j$ and the determined rescaling method C' is then the method C4' which consists of the random choice of a datum from each group of data $D'_k$.

10. A method according to claim 1, wherein the data $d''_k$ are equal to those obtained by applying the scaling method C directly to distinct and consecutive groups of data D respectively sized $n''_k$.

11. A method according to claim 10, wherein the determined scaling method C is the method C3 based on the computation of the mean of each group of data $D_j$ and the rescaling method C' is the method C3' based on the computation of the mean of each group of data $D'_k$.

12. A method according to the claim 10, wherein the determined scaling method C is the method C1 based on the computation of the minimum of each group of data $D_j$ and the rescaling method C' is the method C1' based on the computation of the minimum of each group of data $D'_k$.

13. A method according to the claim 10, wherein the determined scaling method C is the method C2 based on the computation of the maximum of each group of data $D_j$ and the rescaling method C' is the method C2' based on the computation of the maximum of each group of data $D'_k$.

14. A method according to the claim 10, wherein the determined scaling method C is the method C5 based on the choice of the first datum from each group of data $D_j$ and the rescaling method C' is the method C5' based on the choice of the first datum from each group of data $D'_k$.

15. A method according to the claim 10, wherein the determined scaling method C is the method C6 based on the computation of the last datum from each group of data $D_j$ and the rescaling method C' is the method C6' based on the choice of the last datum from each group of data $D'_k$.

16. A method according to the claim 10, wherein the determined scaling method C is the method C3 based on the computation of the mean of each group of data $D_j$, then the method C8 based on the computation of the variance of each group of data $D_j$ and the rescaling method C' is the method C8' based on the means of the groups of data $D'_k$ resulting from the scaling according to C8 and the variances of the groups of data $D'_k$ resulting from the scaling according to C3.

17. A method according to the claim 10, wherein sizes $n'_j$ and $J_k$ are all powers of two.

18. A method according to claim 17, wherein the determined scaling method C is the method C3 based on the computation of the mean of each group of data $D_j$ and then the method C9 based on a decomposition of the variance of each group of data $D_j$ into a series of coefficients each describing the variability at a particular scale, and the rescaling method C' is then the method C9', based on the means of the groups of data $D'_k$ resulting from the scaling according to C9, and a decomposition of the variance of the groups of data $D'_k$ resulting from the scaling according to C3.

19. A method according to the claim 10, the data being vectors, wherein the determined scaling method C is the method C3 based on the computation of the mean of each group of data $D_j$ and then the method C10 based on the computation of the covariance of each group of data $D_j$ and the rescaling method C' is the method C10' based on the computation of the means of the groups of data $D'_k$ resulting from the scaling according to C10 and of the covariances of the groups of data $D'_k$ resulting from the scaling according to C3.

20. A method according to the claim 10, the data being vectors, wherein the determined scaling method C is the method C3 based on the computation of the mean of each group of data $D_j$, and then the method C11 based on the computation of the sum of the terms of the diagonal of the covariance matrix of each group of data $D_j$ and the rescaling method C' is the method C11' based on the computation of the mean of each group of data $D'_k$ resulting form the scaling according to C11 and the sum of the terms of the diagonal of the covariance matrix each group of data $D'_k$ resulting from the scaling according to C3.

* * * * *